United States Patent
Brunn et al.

(10) Patent No.: US 10,848,927 B2
(45) Date of Patent: Nov. 24, 2020

(54) CONNECTED INTEREST GROUP FORMATION

(71) Applicant: International Business Machines Corporation, Armonk, NY (US)

(72) Inventors: Jonathan F. Brunn, Logan, UT (US); Laura J. Rodriguez, Durham, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 209 days.

(21) Appl. No.: 15/862,402

(22) Filed: Jan. 4, 2018

(65) Prior Publication Data

US 2019/0208370 A1  Jul. 4, 2019

(51) Int. Cl.
| | | |
|---|---|---|
| *G06Q 10/10* | (2012.01) | |
| *G06Q 10/06* | (2012.01) | |
| *G06Q 30/02* | (2012.01) | |
| *G06Q 40/02* | (2012.01) | |
| *G06Q 99/00* | (2006.01) | |
| *H04W 4/08* | (2009.01) | |
| *G06Q 50/00* | (2012.01) | |
| *H04L 12/58* | (2006.01) | |
| *G06F 16/901* | (2019.01) | |

(52) U.S. Cl.
CPC .......... *H04W 4/08* (2013.01); *G06F 16/9024* (2019.01); *G06Q 50/01* (2013.01); *H04L 51/32* (2013.01)

(58) Field of Classification Search
CPC ..... G06Q 50/01; G06F 16/9024; H04W 4/08; H04L 51/32

USPC .......................................... 705/1.1–912, 319
See application file for complete search history.

(56) References Cited

U.S. PATENT DOCUMENTS

| | | | |
|---|---|---|---|
| 8,312,056 B1 | 11/2012 | Peng et al. | |
| 8,600,920 B2 | 12/2013 | Flinn et al. | |
| 8,606,792 B1* | 12/2013 | Jackson | H04L 51/32 707/748 |
| 9,524,464 B2* | 12/2016 | Davulcu | G06N 5/02 |
| 10,140,289 B2* | 11/2018 | Chew | G06F 16/93 |
| 10,152,544 B1* | 12/2018 | Friggeri | G06F 16/9535 |
| 2010/0189295 A1* | 7/2010 | Datz | H04R 1/30 381/340 |
| 2012/0290950 A1* | 11/2012 | Rapaport | H04L 51/32 715/753 |
| 2014/0019539 A1 | 1/2014 | Novak et al. | |
| 2014/0037227 A1* | 2/2014 | Zhang | G06K 9/6219 382/286 |
| 2014/0143228 A1* | 5/2014 | Blue | G06F 15/17306 707/709 |
| 2014/0379729 A1* | 12/2014 | Savage | G06Q 10/10 707/748 |

(Continued)

*Primary Examiner* — Jonathan P Ouellette
(74) *Attorney, Agent, or Firm* — Fabian VanCott; Steven L. Nichols

(57) ABSTRACT

Formation of connected interest groups in communication threads is described. According to the computer-implemented method, a number of communications within a communication thread that reflect a similar sentiment related to a topic are detected. A level of connectedness of authors of a set of the number of communications is determined and a connected interest group is formed. The connected interest group includes authors with a level of connectedness greater than a predetermined threshold. An indication of the connected interest group is then provided.

19 Claims, 7 Drawing Sheets

(56) References Cited

U.S. PATENT DOCUMENTS

| | | | |
|---|---|---|---|
| 2015/0081725 A1* | 3/2015 | Ogawa | G06Q 50/01 707/754 |
| 2015/0120583 A1* | 4/2015 | Zarrella | G06Q 30/018 705/317 |
| 2015/0120721 A1* | 4/2015 | Kim | G06F 16/9024 707/728 |
| 2015/0256634 A1* | 9/2015 | Bastide | G06Q 50/01 709/204 |
| 2016/0048556 A1* | 2/2016 | Kelly | G06F 16/9535 707/767 |
| 2017/0277691 A1* | 9/2017 | Agarwal | G06F 16/24578 |
| 2018/0089595 A1* | 3/2018 | Martin | G06F 16/9535 |
| 2018/0189691 A1* | 7/2018 | Oehrle | G06N 5/02 |
| 2019/0197125 A1* | 6/2019 | Ma | G06F 16/438 |

\* cited by examiner

CONNECTED INTEREST GROUP FORMATION

BACKGROUND

The present invention relates to communication thread management, and more specifically to the formation of connected interest groups within a communication thread. Social networking environments are becoming more and more used in modern society. Through these social networking environments, users can share opinions related to different topics. For example, a first user can write an article or message relating to a particular topic. That user can then post the article or message to a public forum where their friends or other connections can read, share, forward, like, or comment on the article or message.

SUMMARY

According to an embodiment of the present invention, a computer-implemented method for forming connected interest groups is described. According to the method, a number of communications within a communication thread that reflect a similar sentiment related to a topic are detected. A level of connectedness is determined for authors of a set of those communications. A connected interest group is formed from the authors. The connected interest group includes authors with a level of connectedness greater than a predetermined threshold. According to the method, an indication is provided of the connected interest group.

A system is also described. The system includes a topic clusterer to determine a topic for a communication thread. A sentiment analyzer of the system detects a set of communications within the communication thread that reflect a similar sentiment related to the topic. A graph analyzer determines a connected interest group by 1) determining a level of connectedness of authors corresponding to the set of communications that reflect the similar sentiment related to the topic and 2) forming a connected interest group by grouping authors having a level of connectedness greater than a predetermined threshold. Via an interface of the system, a visual indication of the set of communications corresponding to the connected interest group is provided.

The present specification also describes a computer program product. The computer program product includes a computer readable storage medium having program instructions embodied therewith. The program instructions are executable by a processor to cause the processor to 1) determine a topic for a communication thread; 2) detect, within the communication thread, a number of communications that reflect a similar sentiment related to the topic; and 3) determine a level of connectedness of authors corresponding to the set of communications that reflect the similar sentiment related to the topic. The level of connectedness is based on 1) a level of connectedness within a local environment where the communication thread is presented; 2) a level of connectedness within at least one other environment; and 3) a level of interaction with other authors corresponding to the set of communications that reflect the similar sentiment related to the topic. The program instructions are also executable by the processor to cause the processor to form a connected interest group by grouping authors with a level of connectedness greater than a predetermined threshold and to group communications that correspond to the connected interest group.

DETAILED DESCRIPTION

Figure 1:
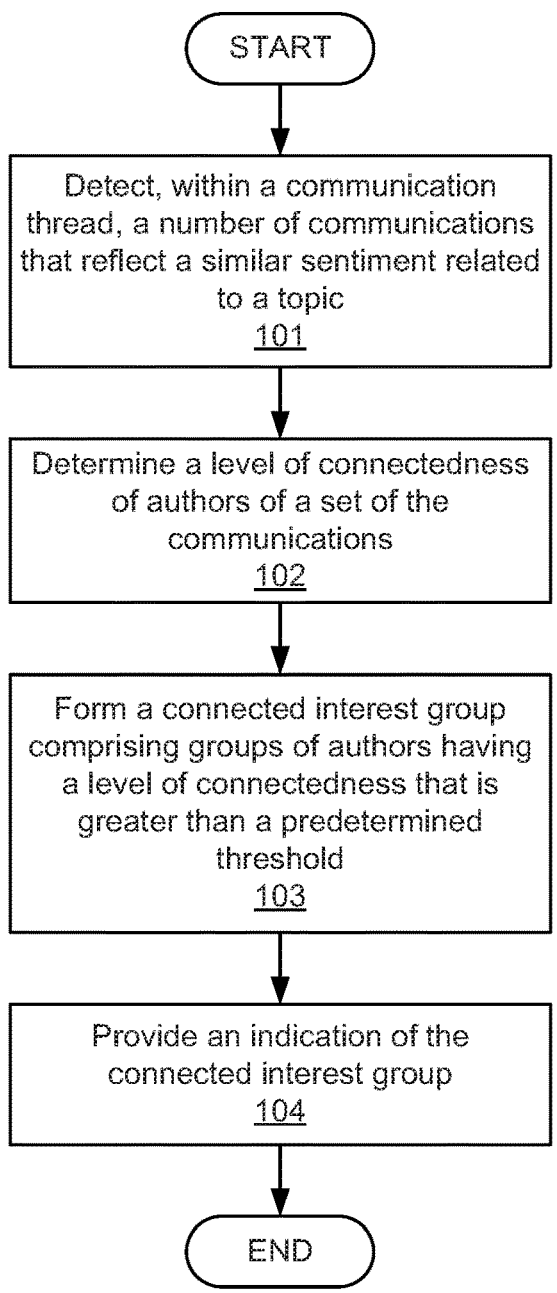
FIG. 1 depicts a flowchart of a method for forming a connected interest group within a communication thread environment, according to an example of principles described herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As described above, social networking environments are a growing part of modern society. Specifically, such social networking environments provide users with an outlet to share their thoughts and feelings regarding a wide variety of topics. Such social networking environments can also be used to determine public opinion regarding topics. Valuable discussion and opinions can be shared within these social networking environments, and open social networking environments fosters healthy public discourse. However, while social networking environments as described herein can be beneficial, some aspects may reduce their positive effect on a group of people, and potentially society as a whole.

Specifically, in some cases, vocal groups may collaborate to dominate a particular communication thread. The opinions shared by these vocal groups may not be representative of the audience of the communications thread and may impede accurate transfer of information. For example, given a political election, a small group of active citizens may pool their efforts in the support of a particular candidate or policy. This small group can be proactive in posting, liking and sharing each other's posts, and otherwise working to forward their position. However, it may be that the majority of citizens in the community may not share this view, and that the vocal minority's opinion relating to the election may skew an outsider's perception of the election landscape. In the above case, such active efforts by a citizenry is laudable as carrying out of a civic duty. However, in other examples, for example not related to a political election, efforts by a vocal minority may be nefarious in purpose. Even in the absence of someone actively, maliciously, or even for-hire trying to influence a conversation, readers may get a skewed perspective just based on who shares links. This is especially true in small conversations with tens or hundreds of responses (instead of thousands). Moreover, even if responses are completely representative of public opinion, different nuances and ways of expressing ideas and novel insights may be found in different cliques. That is, even if posts are representative of an overall opinion, if shared by a connected interest group, reading such communications from individuals who are connected may stifle creative and innovative ways of thinking as compared to a selection of comments from different cliques.

Accordingly, the present specification identifies scenarios when a set of communications, especially those associated with a particular sentiment, might not be representative of overall sentiment on a topic. Such an analysis is done using graph operations on the audience and authors of comments. Specifically, given a set of communications that express a similar sentiment relating to a topic, the present specification describes how a system can analyze network relationships of those individuals posting the communications. If a group of people who are posting communications with a certain sentiment are closely connected, and the audience of the communication thread includes other groups of people, those connected interest groups are identified and communications by those connected interest groups may be visually connected. As members of a closely knit group are more likely to echo each other and say similar things (albeit with potentially different language), the present specification allows a participant in a communication thread, or a manager of the communication thread, to more quickly survey all the viewpoints expressed in the communication thread without re-reading similar posts from people who are influencing each other to say similar things.

Note that this differs from simply grouping posts by response topic or sentiment. That is, under the current system and method, if a large number of users who are unconnected or only loosely connected are posting communications with a similar sentiment, these are still treated as different interest groups, even if they share the same sentiment. Thus, the present system can help even casual users without access to advanced analytical tooling to identify scenarios when a viewpoint is widely held even among unconnected individuals in a social network, as compared to when a viewpoint that appears to be representative of a large group is instead promulgated by a strongly-connected clique.

Such a system facilities a more accurate dissemination of information, and evaluation of public opinion, within a communication thread by accounting for the effects of connected group of users that share a similar sentiment and so indicating such a connected interest group to a participant in the communication thread and/or a manager of the communication thread. However, it is contemplated that the systems and method disclosed herein may address other matters and deficiencies in a number of technical areas.

As used in the present specification and in the appended claims, the term "a number of" or similar language is meant to be understood broadly as any positive number including 1 to infinity.

Further, as used in the present specification and in the appended claims, the term "connected interest group" refers to a set of authors of communications in a communication thread. The set of authors of the connected interest group may be a subset of all authors within the communication thread. The communications corresponding to the authors have a similar sentiment relating to a particular topic.

Turning now to the figures, FIG. 1 depicts a flowchart of a method (100) for forming a connected interest group within a communication thread environment, according to an example of principles described herein. According to the method, a number of communications that reflect a similar sentiment related to a topic are detected (block 101) within a communication thread. The communication thread may be any type of thread in any type of environment where different users can interact with one another. Specific types of threads include email threads, threads within a calendaring system, instant message threads, short message service threads, wiki threads, community threads, newsfeed threads, project collaboration threads, and product review threads. These threads may also correspond to any number of social network environments where the communication threads are presented. For example, the social networking environment may be a community thread or may relate to a news outlet. Other examples of social networking environments where such communication threads may be presented include email environment, a calendaring environment, an instant messaging environment, a short messaging service environment, a wiki environment, a community environment, a newsfeed environment, a project collaboration environment, and a product review environment.

Detecting (block 101) communications with similar sentiments towards a topic can first include determining a topic for a communication thread or a portion of a communication thread. Such a determination can happen in any number of ways. Generally, topic determination includes a statistical study of a corpus of documents, which documents may refer to communications, and the corpus may refer to the communication thread, or a portion of the communication thread. Through this statistical analysis patterns can be determined that indicate a particular topic to which the communication thread, or at least a portion of the communication thread is directed. Such topical determination may include the use of a natural language analyzer and/or text classification framework to collect, analyze and summarize the documents, i.e., communications, within the communication thread. In a specific example of topic clustering, a set of communications is aggregated and latent topics are extracted based on a clustering of words within those communications.

Latent Dirichlet allocation (LDA) is one specific example of textual classification. Using LDA, and topic models in general, topics, or sometimes "latent topics" are extracted from text. LDA and other frameworks may use unsupervised methods to define or find a representation of topics, existing or latent, in the text already even in the absence of labels. Documents can be represented as a percentage of the various topics. Topics are often found in an unsupervised manner, and so do not necessarily themselves have names or even meaning that can be named.

In the present application, the system may treat a thread, group, or page as a body of text. Posts by an individual, or posts from candidate connected group or such posts within a thread, group or page, may be treated as a document for the purposes of topic modeling. A topic model may initially be created by treating combinations of documents as a corpus and using a topic modeling framework such as LDA. Accordingly, for each document, a distribution of topics can be found for each document. In cases where a single user's contributions are treated as a document, this distribution can then be compared to those of other users in a group that is considered a candidate to be an interest group. Distances between topic distributions of different documents can be found by cosine distance of a vector whose components represent percentages of various topics, or using distances between probability distributions. A similarity metric is determined for different documents by using an inverse of these documents, or a representation based on the inverse of the distance such as the log or square of the inverse. If documents are sufficiently similar, as defined by a threshold, the documents may be thought of as having "topical similarity". The degree of topical similarity is then one feature which is used in deciding if the posters corresponding to the documents are in a connected interest group.

Some frameworks, such as LDA, rely on the number of topics to find as input. According to the present specification, the number of topics to use may vary and can be a factor of the number of posts and posters, and hence documents, involved, whether the documents are represented as individual posts or the aggregation of posts by user, the degree of variation in discourse on a particular page, group or site. The number of topics may be a tuning parameter, but the system may also sample results with different numbers of topics in order to maximize other metrics, such as a user feedback score, manual human ranking of the end result or correspondence with a human curated ground truth of similarity of posts in a particular domain.

Once content is represented in this way, i.e., where distances are described between documents and hence users who created the posts contained in the documents, the documents and hence users may also be clustered to find candidate interest groups according to their topical similarity.

Detecting (block 101) a similar sentiment expressed in a number of communications of a communication thread can happen in any number of ways. For example, a natural language analyzer can scan and recognize trigger words that relate to a particular sentiment. Note that in this example, different communications can use different language but relate to the same sentiment. Such a sentiment analysis may also rely on statistical analysis to determine, from those trigger words, and a quantity of those trigger words, an overall sentiment expressed within the particular communication.

Sentiment analysis refers to the extraction or categorization of an opinion from text about a subject. Tone and emotion analysis extract emotions like assertiveness, confidence, tentativeness (tone) and fear, anger, happiness (sometimes thought of either as emotion or tone analysis). Sentiment analysis is a form of natural language classification which uses machine learning models such as support vector machine (SVM) or neural networks. Such classification typically represents a set of features from text as a vector, where each component of the vector may represent a feature or set of features, then find patterns or ways to separate or classify inputs according to those features.

Features may be words, lemmatized words, or more generally, lemmatized n-grams or sequences of words. Other features may be, or take into account, word order, adjacent words, grammatical features such as part of speech, verb tense, of various words, the existence of negation, conditionals, etc. Natural language processing, including parse trees, may be used to create a set of features. In some cases, classifiers may be used to create input features to a final classifier.

Emotion and sentiment similarity between posts may be quantified, again using distance metrics as described above for topic modeling, or more simply just by the existence of the same emotions or sentiments in a binary manner.

Multiple distance or similarity metrics defined over different features may be combined into a single metric that accounts for all. For example, a linear combination may be used. Other metrics may be used as well. In this way, similarity from a number of features may be used to define an overall similarity. Machine learning approaches, including neural networks, may be employed to find optimal ways to combine these features.

The system may then determine (block 102) a level of connectedness of authors of a set of the communications. As used in the present specification, the term "a set of communications" refers to a sub-group of the number of communications that are authored by any number of authors. For example, in a social network environment, a "set" of posts may be responses made by users and/or the initial post made by a user. Different users, or different groups of users, may have different levels of connectedness. For example family members and close friends may be closer than individuals who reside in the same neighborhood but don't interact. Accordingly, determining (block 102) a level of connectedness may consider any number of factors including connection, interaction with one another on the social networking environment (i.e., likes, shares, comments, re-posts), etc. of the users within a group.

In one example, the level of connectedness is determined (block 102) related to the local environment through which the communication thread is presented. For example, if the communication thread is presented to a message forum on a social networking site where users create profiles and have connections with other users, the level of connectedness may refer to the connection, and strength thereof, within that local environment. In some examples, the level of connectedness reflects a level of connectedness within additional environments. Continuing this example, the system may perform additional network analysis to determine that in addition to being connected through a social networking site, the computing devices of these users is geographically similar. Examples of additional environments that can be factored when considering an overall level of connectedness include computing networks, other social networks, geographic connectedness, etc.

A level of connectedness is determined (block 102) for various groups, or authors related to different sets of posts. The level of connectedness may be determined in any number of ways. For example, the authors of communications within the communication thread may be represented as a graph with nodes representing authors, and edges between nodes representing connections within the social networking environment. For a given group of authors, the graph may have a certain density, referring to the number of actual connections per the number of possible connections. That is, for a graph with a set of n nodes, the possible connections or edges is the $n*(n-1)/2$. A graph with maximal vertices can therefore be thought of as having a density of 1 and a graph with no connections can be thought of as having a density of 0, with a common metric of density simply being the percent of possible connections which exist in the graph. Density may be considered for any subgraph or a larger graph, and subgraphs with density 1 being called cliques. Graphs with density "close to one" are then called "near cliques".

For example, given a group of four individuals, the number of possible connections may be six, and the number of actual connections may be four, thus resulting in a graph density of 0.66. Note also that each edge of the graph may be weighted differently. For example, in a graph one edge may be weighted to indicate that a strong level of connectedness exists between two users on account of their multiple interactions with each other via the social networking environment. In one example, this weight can be scaled to a range of 0 to 1 and then used in computing the density. For instance, in the above example, if two of the four connected individuals had weights of 1 for the connections, and the other two had weights of 0.5, the overall density could be computed as $(2*1+2*0.5)/6=0.50$ instead of 0.66. While specific reference is made to a particular manner to weigh the connections, there may be various ways to weigh a combination of factors and actions indicating a connection to produce a single weight for a connection. Accordingly, in one example, the level of connectedness of the authors includes determining a graph density for the authors.

Such a determination of level of connectedness across a network of users is referred to as network analysis. In one example, the network analysis may be performed following a determination (block 101) of communications that reflect a similar sentiment. For example, rather than performing a network analysis of all groupings of authors in a communication thread, such a network analysis may be performed for just those users that correspond to communications with a similar sentiment. For example, suppose users A-M all contribute to a communication thread. However, it is determined that communications from users A, C, E, G, I, K, and M share a first sentiment related to the topic of a to-be released product and that communications from users B, D, F, H, J, and L share a second sentiment related to the topic of the to-be released product. Accordingly, rather than determine a level of connectedness between different configurations of users A-M, the system may determine (block 102) a level of connectedness between different configurations of users A, C, E, G, I, K, and M and different configurations of users B, D, F, H, J, and L. Thus the overall network analysis is simplified. Thus, in summary, the level of connectedness of authors refers to a level of connectedness of authors related to comments having a similar sentiment.

With this data in hand, the system can form (block 103) a connected interest group that includes groups of authors having a level of connectedness that is greater than a predetermined threshold. As described above, a connected interest group refers to a group of authors who are closely connected and who have authored communications having a similar sentiment relating to the topic. For example, continuing the example above where users A, C, E, G, I, K, and M are authors of a number of communications that share a similar sentiment. Suppose in this example, that users A, C. E, and G are determined to have a certain level of connectedness. This certain level of connectedness of this grouping is then compared against a predetermined threshold to determine if the level of connectedness is indicative of a connected interest group. For example, some users may be connected, i.e., share a connection in a social networking environment, but may not interact with one another significantly enough to be connected above a threshold level so to be considered a connected interest group. However, in this example, users A, C, E, and G may be so connected to be greater than the predetermined threshold. As these users also belong to a group of authors that have communications that share a sentiment, users A, C, E, and G may be formed (block 103) into a connected interest group. Note that these users may have communications that share sentiments with other users, i.e., I, K, and M, but are not connected enough such that it is advantageous to maintain their communications separate from the connected interest group of A, C, E, and G. Returning to the graph relationship, the formation (block 103) of a connected interest group may include determining that a graph representing the authors, (e.g., A. C, E, and G) have a density greater than a threshold graph density.

In this example, the predetermined threshold may differ depending on various criteria including, but not limited to the environment, the topic, and the manager of the communication thread. For example, a manager may set a high threshold by which communication authors are grouped regarding a first topic, but may set a lower threshold by which communication authors are grouped regarding a second topic.

An indication of the connected interest group is then provided (block 104). For example, a participant or a manager of the communication thread is notified that a connected interest group exists. In some examples, this may include providing an icon next to avatar's representing those authors, or iconic indications relating to the communications authored by those in the connected interest group. In another example, the communications corresponding to the connected interest groups may be grouped together. Accordingly, rather than re-reading communications of a group that has mobilized to dominate a communication thread, views from disparate, i.e., not connected, groups can be surveyed. In other words, this method (100) presents an indication when a particular connected interest group is dominating a communication thread by posting disproportionately. This allows content consumers to identify cases when a particularly close knit group of people is dominating a conversation and to take that into account when analyzing the communication thread. The system may also provide statistics about each group, such as the number of messages and users represented.

That is not to say that all similar sentiment communications are grouped, just those that originate from users who are tightly connected with one another. That is, a connected interest group is not just a group of people with similar interests, but a group of people who are influencing each other in those interests and hence whose views may not be representative of the broader public.

As described above, the provision (block 104) of such an indication may be made to end users, i.e., audience, of the communication thread. The provision (block 104) of this information, and in some cases more in-depth information regarding the connectedness, the connected interest group, and the similarity of sentiment, may be shared with a manager of the communication thread. With this information the manager may adjust how the communication thread is managed based on the information. For example, the manager may limit the communications permitted for a particular connected interest group, or may tailor the communication thread, or topics of the communication thread, based on the characteristics of the connected interest group.

As another example, the manager may choose to reply to sample messages from each connected interest group. For example, a sample of messages from across connected interest groups may be presented to the manager to reply or react to. In some cases, the system may employ a round robin approach, presenting the manager with messages from each connected interest group to which to reply. In another example, the system may employ a weighted round robin approach. In this approach, messages are sampled from the various interest groups to show to the manager, but more weight is given to some interest groups so the manager will see a larger sample of messages from those interest groups. In effect, the weighted round robin may skip some groups sometimes, or process multiple sequential messages from a single group according to the relative weights. Weights may be based on the relative sizes of the groups, facilitating a proportional reaction from the manager to all connected interest groups. The weight may also be based on input from the manager expressing the importance given by the manager to each group. This weight may be learned based on past interaction ratios from the manager to these groups. In one examples, weights may be learned through a gradient descent of a multiple feature model where features are extracted from the conversations to be replied to in each connected interest group and may include sentiment and topic. In one example, the system may use an inverse of the learned weights to encourage participation from groups the manager is not inclined to react to. In one example, the tool for processing or consuming messages is presented not just to managers, but all users.

By so doing, the present method (100) ensures that the theme of a communication thread is more representative of the collective body of authors by accounting for interest groups that have mobilized to push a particular viewpoint. As described above, the manager can adjust their attention based on a set of goals—for instance, equal or proportional reaction across connected interest groups, or a goal of countering the manager's natural biases to reaction or reply to some connected interest groups, or a goal of facilitating the manager in using their judgement when selecting where to reply, while still appropriately sampling. As described above, these connected interest groups, if vocal, can skew a consideration of the information presented in a communication thread, but providing (block 104) an indication of such connected interest groups offsets the skew that may otherwise result and results in a wider diversity of opinion from different groups, rather than being mostly from a few vocal groups, i.e., connected interest groups. Specifically, the present method (100) allows for the identification of groups of users who have mobilized to direct a particular communication thread.

Figure 2:
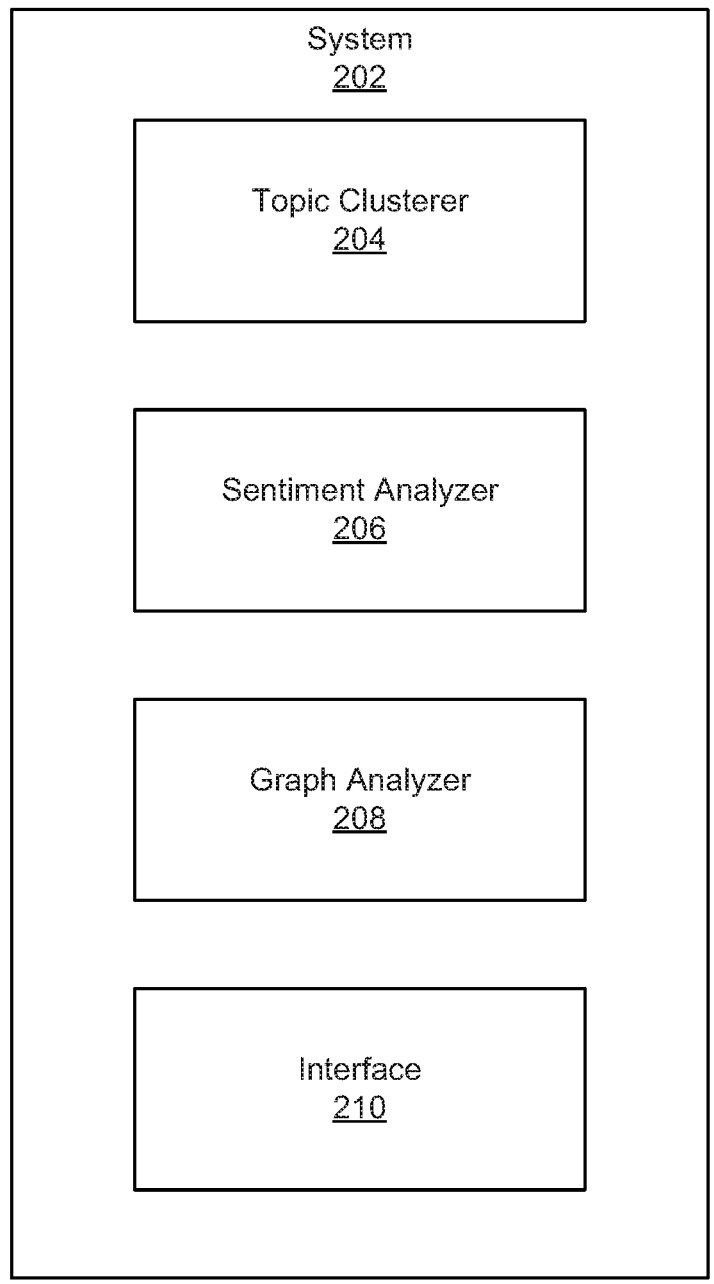
FIG. 2 depicts a system for forming a connected interest group within a communication thread environment, according to an example of the principles described herein.

FIG. 2 depicts a system (202) for forming a connected interest group within a communication thread environment, according to an example of the principles described herein. To achieve its desired functionality, the system (202) includes various components. Each component may include a combination of hardware and program instructions to perform a designated function. The components may be hardware. For example, the components may be implemented in the form of electronic circuitry (e.g., hardware). Each of the components may include a processor to execute the designated function of the component. Each of the components may include its own processor, but one processor may be used by all the components. For example, each of the components may include a processor and memory. Alternatively, one processor may execute the designated function of each of the components.

The system (202) includes a topic clusterer (204). The topic clusterer (204) determines a topic for a communication thread or a portion of a communication thread. Specifically, the topic clusterer (204) may perform textual analysis of the communications in a communication thread for trigger words that indicate latent topics. Based on the frequency and placement of those words, a topic can be determined for a particular communication thread.

The system (202) also includes a sentiment analyzer (206) to determine sentiments of communications within the communication thread. For example, a sentiment analyzer (206) may be a natural language processor that scans the different communications for words or phrases associated with a particular sentiment. Note that in some examples, different trigger words are more indicative of a particular sentiment than others.

The system (202) also includes a graph analyzer (208). The graph analyzer (208) performs network analysis to determine a level of connectedness of various groupings of users. The level of connectedness indicates a measured degree of relational separation of the authors within a social networking environment. As described above, rather than performing network analysis on all combinations of groupings, the graph analyzer (208) performs network analysis on just groupings of authors who are associated with communications having a similar sentiment. Specifically, the graph analyzer (208) determines a level of connectedness by considering any number of factors related to connections between different users. For example, connectedness may be based on connection within the local networking environment, and additional environments. Connectedness may also be based on not only whether people are connected, but also on their interactions. That is, the graph analyzer (208) may weight connectedness based on interactions between the authors. For example, users that frequently comment, repost, and share each other's communications may have a stronger level of connectedness as compared to users that simply are connected, or linked, within a social networking environment. The graph analyzer (208) may take all this data and combine it into some metric, or measure, of connectedness of a group.

In addition to determining a level of connectedness, the graph analyzer (208) can form certain groups into connected interest group, when a group of authors' level of connectedness is greater than a threshold amount. As described above, the threshold amount may be set based on the communication thread, the environment, or any other criteria. Accordingly, a connected interest group refers to a group of users who have 1) a level of connectedness greater than a threshold level and 2) have posted communications that share a sentiment related to a particular topic. Note that other users who have a level of connectedness greater than the threshold level but who have not posted communications, or that have posted comments that do not that share a sentiment related to the topic are not grouped into a connected interest group. Still further, users who have posted communications that share a sentiment related to a particular topic but that do not have a threshold level of connectedness are not grouped as a connected interest group. Accordingly, the graph analyzer (208) provides for a diversity of opinion, and accounts for the skewed perception that can prevail if a particular connected interest group dominates the communication thread without being identified as such a connected interest group.

The system also includes an interface (210) to provide a visual indication of the set of communications corresponding to the connected interest group. Such a visual indication may take many forms. For example, an icon, or other identifier may be placed on an avatar corresponding to each author of the connected interest group identifying them as such. In another example, the messages are visually grouped. In this example, any user, even those outside of the connected interest group, can adjust their opinion based on the comments and activity of these connected interest groups.

Figure 3:
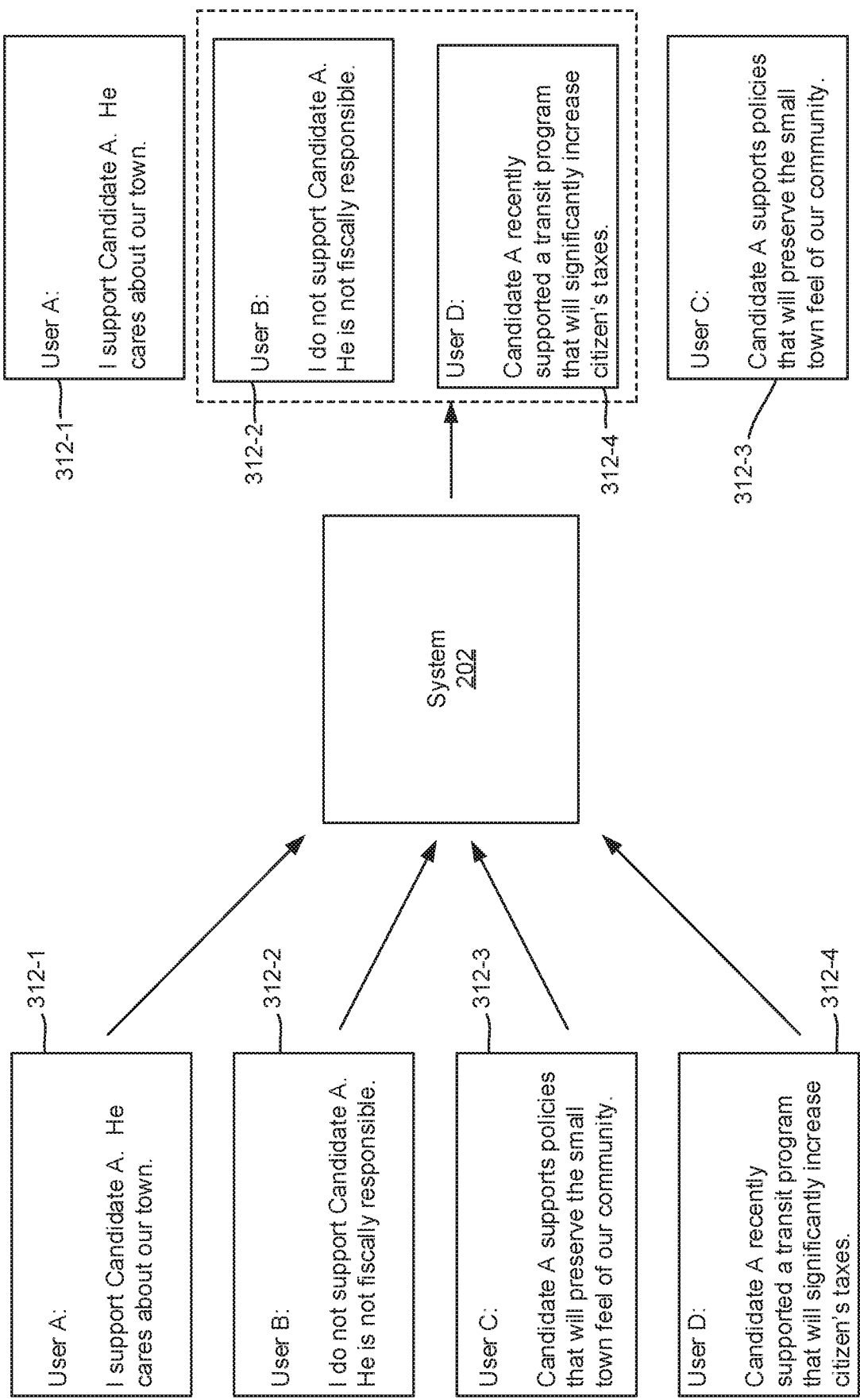
FIG. 3 depicts the grouping of communications corresponding to a connected interest group, according to an example of principles described herein.

FIG. 3 depicts the grouping of communications (312) corresponding to a connected interest group, according to an example of principles described herein. In this example, a group of authors have posted communications relating to a particular candidate in a political election. These communications (312-1, 312-2, 312-3, 312-4) are passed to the system (202) determine whether a connected interest group could be formed. Specifically, in this example, the topic clusterer (FIG. 2, 204) performs operations to determine a topic from the communication. In this example, the topic may be identified as "Candidate A" given the propensity and location of that phrase in each of the communications (312).

Figure 4:
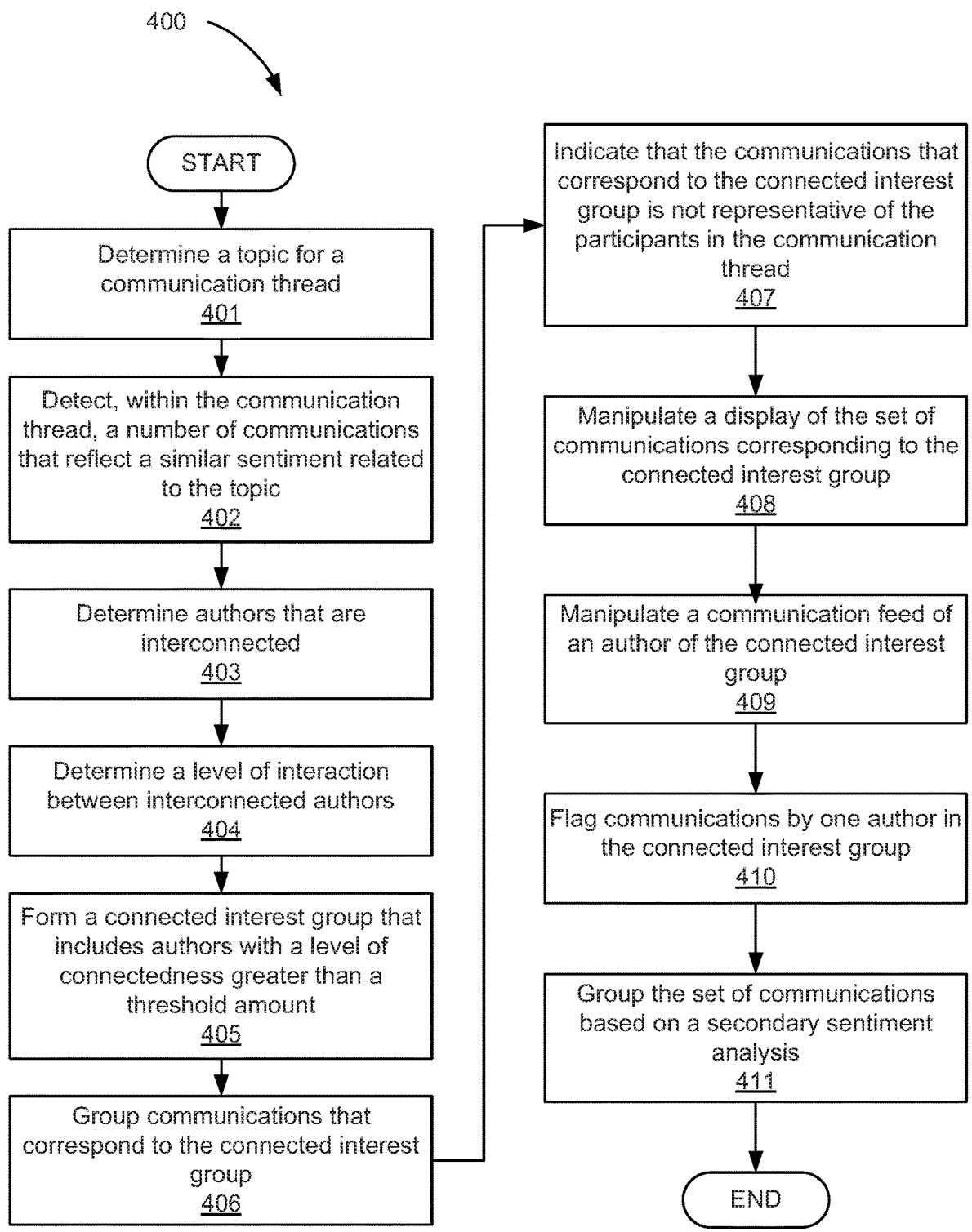
FIG. 4 depicts a flowchart of a method for forming a connected interest group within a communication thread environment, according to an example of principles described herein.

The sentiment analyzer (FIG. 2, 206) can then evaluate each communication (312) to determine a sentiment of those messages. I sentiment analyzer (FIG. 2, 206), using natural language analysis, may indicate that a first comment (312-1) and a third comment (312-3) have a positive sentiment regarding the topic, i.e., Candidate A. The sentiment analyzer (FIG. 2, 206) may also determine that the second communication (312-2) and the fourth communication (312-4) have a negative sentiment regarding the topic, i.e., Candidate A. Note that FIG. 4 is presented for illustration and is not necessarily reflective of the quantity of communications (312) that may be posted related to a particular topic.

The graph analyzer (FIG. 2, 208) can then evaluate the relationships between different groups of the authors. However, as noted above, the graph analyzer (FIG. 2, 208) may avoid performing network analysis of all users, i.e., User A, User B, User C, and User D. Rather, the graph analyzer (FIG. 2, 208) may perform graph, or network, analysis based on those users who have authored communications (312) that have a shared sentiment. That is, the graph analyzer (FIG. 2, 208) may determine a level of connectedness between Users A and C and a level of connectedness between Users B and D. Again, FIG. 4 represents a simplified example, and such network analysis may be performed on groups larger than two.

In this example, the graph analyzer (FIG. 2, 208) may determine that User A and User C, even though they have authored communications that share a sentiment, do not have a level of connectedness such that they should be formed into a connected interest group. Accordingly, the interface (FIG. 2, 210) visually represents these communications (312-1, 312-3) separately. By comparison, the graph analyzer (FIG. 2, 208) may determine that User B and User D have a level of connectedness such that they, on account also of having authored comments with a similar sentiment towards Candidate A, are formed into a connected interest group. Accordingly, the corresponding communications (312-2, 312-4) authored by these users are visually grouped together.

As described above, the system (202) may first look for groupings of users according to the topic and/or sentiment of their messages, then perform graph analysis to determine if a clique or near clique exists. If this process fails to find that the users expressing a common topic or sentiment form a clique or near-clique, the process proceeds to find maximal cliques or near cliques. Since these users now form a near clique expressing a common topic or sentiment, they are exposed as a connected interest group. Additionally, using these new more refined groupings of users, the system (202) reanalyzes the content according to topic and sentiment since the topic and sentiment of the new groups formed by near cliques may be more narrow than the original topic or sentiment identified in the first step.

It may be, for instance, that the system (202) first identifies a candidate set of users based on shared sentiment and topic, but the users of these messages are not connected with sufficient density to be considered a clique or near clique. In this case, the system (202) may find the maximal near cliques within the original group and identify the greatest common shared topic and sentiment among the group.

In another example, the system (202) may start with graph analysis to find near cliques and may find a set of candidate users based on their common membership in the near clique, but these users may not express a common sentiment or topic. In this case, the users are further divided according to a topic and sentiment analysis. The new set of users corresponding to each topic and/or sentiment group may no longer form a near clique. Accordingly, the system (202) re-analyzes the connectedness of the users in these new groups to find maximal or approximately maximal cliques or near cliques with these new groups. Within these groups, it is then determined that a common topic and/or sentiment was expressed and the users form a near clique or have sufficient density of their connections, so these groups are exposed as connected interest groups.

FIG. 4 depicts a flowchart of a method (400) for forming a connected interest group within a communication thread environment, according to an example of principles described herein. In one example, the method (400) includes determining (block 401) a topic for the communication thread, for example by the topic clusterer (FIG. 2, 204). Such a determination can happen in any number of ways. Generally, topic determination includes a statistical study of a corpus of documents, which documents may refer to communications, and the corpus may refer to the communication thread, or a portion of the communication thread. Through this statistical analysis patterns can be determined that indicate a particular topic to which the communication thread, or at least a portion of the communication thread, is directed. Such topical determination may include the use of a natural language analyzer and/or text classification framework to collect, analyze and summarize the documents, i.e., communications, within the communication thread. In a specific example of topic clustering, a set of communications is aggregated and latent topics are extracted based on a clustering of words within those communications.

Next, the system (FIG. 2, 202) and more specifically the sentiment analyzer (FIG. 2, 206) detects (block 402) those communications (FIG. 3, 312) that share a sentiment related to the determined topic. This may be performed as described above in connection with FIG. 1.

As described above, the graph analyzer (FIG. 2, 208) determines a level of connectedness of a group of authors. Such a level of connectedness may be based on any number of factors including an interconnectedness of the authors. Accordingly, the system (FIG. 2, 202) may determine (block 403) authors that are interconnected. Determining (block 403) interconnectedness may be between more than two users. For example, multiple users may be interconnected one with another. In determining the overall level of connectedness, the method (400) also includes determining (block 404) a level of interaction between the authors, specifically the interconnected authors. Examples of such interactions include one user sharing, commenting, on or "liking" another users communication (FIG. 3, 312). Each such instance of an interaction can weight in favor of the connectedness between two individuals and the level of interconnectedness among a group as a whole.

Next, the system (FIG. 2, 202) can form (block 405) a connected interest group that includes authors, of communications (FIG. 3, 312) with similar sentiments, having a level of connectedness greater than a threshold amount. This may be performed as described above in connection with FIG. 1.

As described above, an interface (FIG. 2, 210) provides a visual indication of the connected interest group. In some examples, this may include grouping (block 406) communications that correspond to the connected interest group. For example, as depicted in FIG. 3, communications (FIG. 3, 312) that exhibit a shared sentiment by authors who have a predetermined level of connectedness can be grouped, one on top of the other. Such a grouping may be on a page, or feed, within a social networking environment.

In addition to grouping (block 406) the communications (FIG. 3, 312) as a visual indication, other indications can be provided as well. For example, in some cases, the system (FIG. 2, 202) may indicate (block 407) that the communications (FIG. 3, 312) of the connected interest group are not representative of the opinion of the entire body of users within the communication thread. For example, the system (FIG. 2, 202) may detect that communications (FIG. 3, 312) of a connected interest group are off-topic, consistently down-voted, or have a disproportionate lack of likes, the system (FIG. 2, 202) may determine that such communications (FIG. 3, 312) are not representative of the general population within the communication thread and may so indicate.

In some examples, the system (FIG. 2, 202) may manipulate (block 408) a display of the set of communications corresponding to the connected interest group. Such manipulation (block 408) may include filtering the communications (FIG. 3, 312). For example, rather than displaying, even as a grouped display, the multiple communications (FIG. 3, 312), a representative communication (FIG. 3, 312) could be selected and the remaining could be hidden. In another example, manipulating (block 408) the display of the communications (FIG. 3, 312) may include hiding completely all of the communications (FIG. 3, 312) of the connected interest group, for example if the communications (FIG. 3, 312) are deemed offensive, malicious, or nefarious. In such examples, this manipulation (block 408) may be executed with or without user input. For example, a user input may trigger the manipulation (block 408) or the system (FIG. 2, 202) without any additional user input may perform such a manipulation (block 408).

The system (FIG. 2, 202) may also manipulate (block 409) a communication feed of an author of the connected interest group. For example, once a first user is part of a connected interest group, subsequent communications (FIG. 3, 312) of other authors within the connected interest group may be promoted, or otherwise highlighted in the first user's communication feed. In another example once a first user is part of a connected interest group, the other users, and their communications (FIG. 3, 312), even those that have occurred in the past, may be presented to the first user via their communication feed. In another example, the connected interest group is also used to identify communications (FIG. 3, 312) within group members. For example, a comment share from a member of the connected interest group on the topic that the group is interested in, may be highlighted within the communication feeds of other authors of the connected interest group. As another example, the connected interest groups may be used to specifically exclude content from other authors of the connected interest group. For example, once a first user is formed into a connected interest group, communications (FIG. 3, 312) by other users in that connected interest group may be excluded from the first user's communication feed, thus exposing the first user to alternative viewpoints, i.e., those outside of their connected interest group.

In some examples, the system (FIG. 2, 202) flags (block 410) communications by one author in the connected interest group based on a flagging of other authors in the connected interest group. For example, as described above, some communications (FIG. 3, 312) pertaining to a connected interest group may be consistently off-topic, down-voted, or have a disproportionate lack of likes and flagged accordingly. Accordingly, the system (FIG. 2, 202) flags (block 410) communications by one author in the connected interest group based on the other communications (FIG. 3, 312) in the connected interest group being similarly flagged.

In some examples, the system (FIG. 2, 202) groups (block 411) the set of communications (FIG. 3, 312) based on a secondary sentiment analysis. That is, earlier a sentiment analysis was performed to detect those communications (FIG. 3, 312) that shared a sentiment related to a particular topic. The users of those communications (FIG. 3, 312) were then subject to network analysis during the formation of connected interest groups. In this example, a secondary sentiment analysis is carried out to detect a unanimity within the connected interest group.

Such a method (400) can be used for many purposes. For example, the connected interest group may be a special interest group related to a particular product. Accordingly, the system (FIG. 2, 202) can help a content producer to better target an audience. In another example the method (400) may identify special interest groups for a particular topic.

Figure 5:
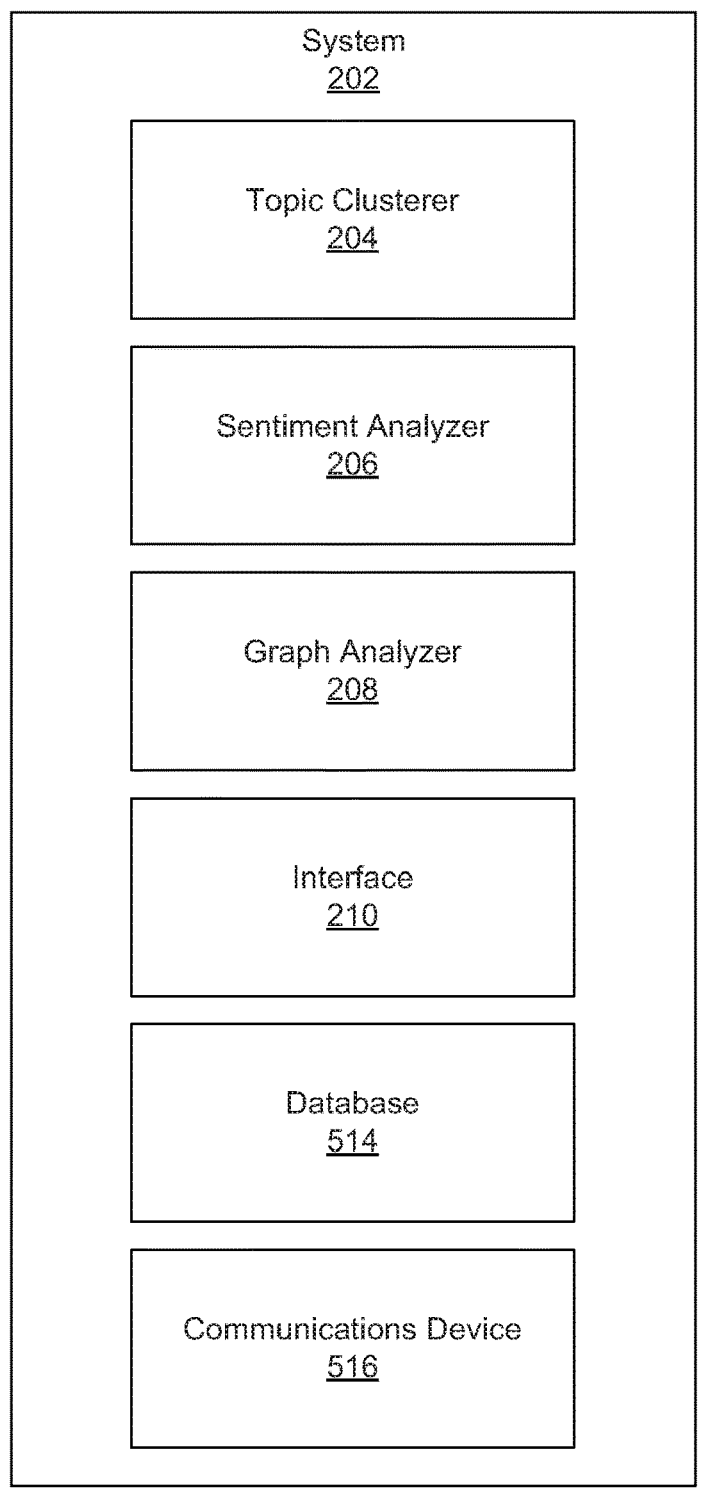
FIG. 5 depicts a system for forming a connected interest group within a communication thread environment, according to an example of the principles described herein.

FIG. 5 depicts a system (202) for forming a connected interest group within a communication thread environment, according to an example of the principles described herein. As described above, the system (202) may include a topic clusterer (204), sentiment analyzer (206), graph analyzer (208), and interface (210).

In some examples, the system (202) includes other components. For example, the system (202) may include a database (514) that stores connected interest group information for use in subsequent communication thread processing. For example, the connected interest group information may include information relating to the users in the connected interest group. Accordingly, if a new communication thread is started and the same users continue to post, then the connected interest group information could be used in that thread as well as the current thread. The database (514) may be used to aggregate posts. In this case, the system (202) may not just use, but identify connected interest groups which become identifiable when considering a set of users (and their connections) across posts as well. For instance, it is possible in some situations that a connected interest group would not be found among people replying to a single post, but when considering a greater set of posts, the set of users expressing a common sentiment form a denser graph.

The system (202) also includes a communication device (516) to provide information relating to at least one of the set of communications (FIG. 3, 312) corresponding to the connected interest group or the connected interest group itself. As described above, some information may be visually displayed to the audience of the communication thread. IN some examples additional information may be passed to managers, owners, or controllers of the environment in which the communication thread is presented or to managers, owners, or controllers of the communication thread. Such information may include statistical information describing the communications (FIG. 3, 312) and authors in the connected interest group. Such information can be advantageous in the operations of those to whom the information is dealt. For example, if a manufacturer identifies the demographics of the connected interest groups that are in favor of their product, they may tailor their marketing to focus on that demographic.

Figure 6:
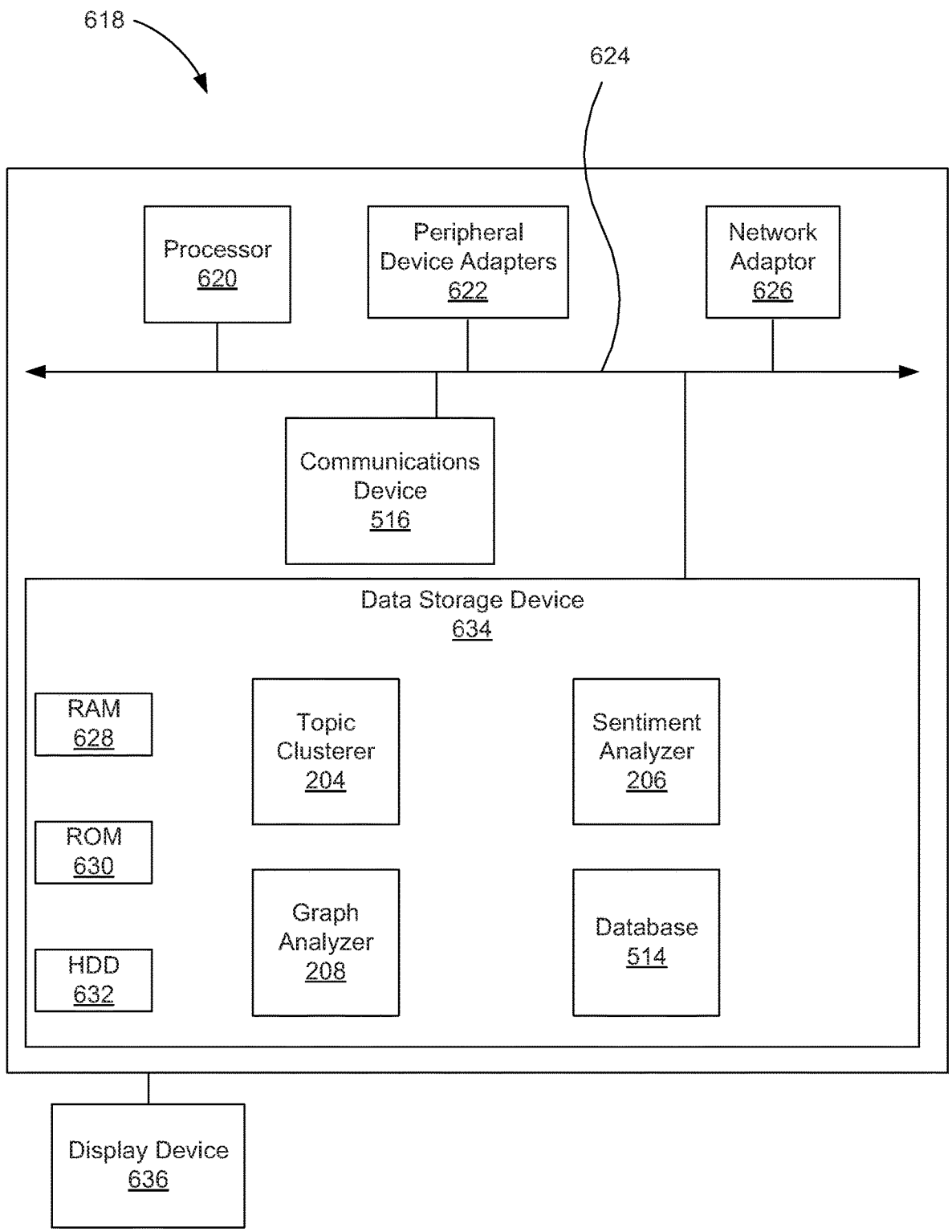
FIG. 6 is a diagram of a computing system for forming a connected interest group within a communication thread environment, according to an example of the principles described herein.

FIG. 6 is a diagram of a computing system (618) for forming a connected interest group within a communication thread environment, according to an example of the principles described herein. The computing device (618) may be implemented in an electronic device. Examples of electronic devices include servers, desktop computers, laptop computers, personal digital assistants (PDAs), mobile devices, smartphones, gaming systems, and tablets, among other electronic devices.

The computing device (618) may be utilized in any data processing scenario including, stand-alone hardware, mobile applications, through a computing network, or combinations thereof. Further, the computing device (618) may be used in a computing network. In one example, the methods provided by the computing device (618) are provided as a service over a network by, for example, a third party.

To achieve its desired functionality, the computing device (618) includes various hardware components. Among these hardware components may be a number of processors (620), a number of data storage devices (634), a number of peripheral device adapters (622), and a number of network adapters (626). These hardware components may be interconnected through the use of a number of busses and/or network connections. In one example, the processor (620), data storage device (634), peripheral device adapters (622), and a network adapter (626) may be communicatively coupled via a bus (624).

First, the computing device (618) includes a communication unit (516) which refers to hardware used to pass information relating to at least one of the connected interest group and the communications (FIG. 3, 312) of the connected interest group to a manager of the communication thread.

The processor (620) may include the hardware architecture to retrieve executable code from the data storage device (634) and execute the executable code. The executable code may, when executed by the processor (620), cause the processor (620) to implement at least the functionality of forming connected interest groups. The functionality of the computing device (618) is in accordance to the methods of the present specification described herein. In the course of executing code, the processor (620) may receive input from and provide output to a number of the remaining hardware units.

The data storage device (634) may store data such as executable program code that is executed by the processor (620) or other processing device. As will be discussed, the data storage device (634) may specifically store computer code representing a number of applications that the processor (620) executes to implement at least the functionality described herein.

The data storage device (634) may include various types of memory modules, including volatile and nonvolatile memory. For example, the data storage device (634) of the present example includes Random Access Memory (RAM) (628), Read Only Memory (ROM) (630), and Hard Disk Drive (HDD) memory (632). Many other types of memory may also be utilized, and the present specification contemplates the use of many varying type(s) of memory in the data storage device (634) as may suit a particular application of the principles described herein. In certain examples, different types of memory in the data storage device (634) may be used for different data storage needs. For example, in certain examples the processor (620) may boot from Read Only Memory (ROM) (630), maintain nonvolatile storage in the Hard Disk Drive (HDD) memory (632), and execute program code stored in Random Access Memory (RAM) (628).

The data storage device (634) may include a computer readable medium, a computer readable storage medium, or a non-transitory computer readable medium, among others. For example, the data storage device (634) may be, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device.

The hardware adapters (622, 626) in the computing device (618) enable the processor (620) to interface with various other hardware elements, external and internal to the computing device (618). For example, the peripheral device adapters (622) may provide an interface to input/output devices, such as, for example, display device (636), a mouse, or a keyboard. The peripheral device adapters (622) may also provide access to other external devices such as an external storage device, a number of network devices such as, for example, servers, switches, and routers, client devices, other types of computing devices, and combinations thereof.

The display device (636) may be provided to allow a user of the computing device (618) to interact with and implement the functionality of the computing device (618). The peripheral device adapters (622) may also create an interface between the processor (620) and the display device (636), a printer, or other media output devices. The network adapter (626) may provide an interface to other computing devices within, for example, a network, thereby enabling the transmission of data between the computing device (618) and other devices located within the network.

The computing device (618) may, when executed by the processor (620), display the number of graphical user interfaces (GUIs) on the display device (636) associated with the executable program code representing the number of applications stored on the data storage device (634). The GUIs may display, for example, interactive screenshots that allow a user to interact with the computing device (618) to input values in association with the memristive array (100) as will be described in more detail below. Additionally, via making a number of interactive gestures on the GUIs of the display device (636), a user may obtain a dot product value based on the input data. Examples of display devices (636) include a computer screen, a laptop screen, a mobile device screen, a personal digital assistant (PDA) screen, and a tablet screen, among other display devices (636). In some examples, the display device (636) is an example of the interface (FIG. 2, 210) through which the connected interest group is indicated.

The computing device (618) further includes a number of modules used in the implementation of the systems and methods described herein. The various modules within the computing device (618) include executable program code that may be executed separately. In this example, the various modules may be stored as separate computer program products. In another example, the various modules within the computing device (618) may be combined within a number of computer program products; each computer program product including a number of the modules.

Figure 7:
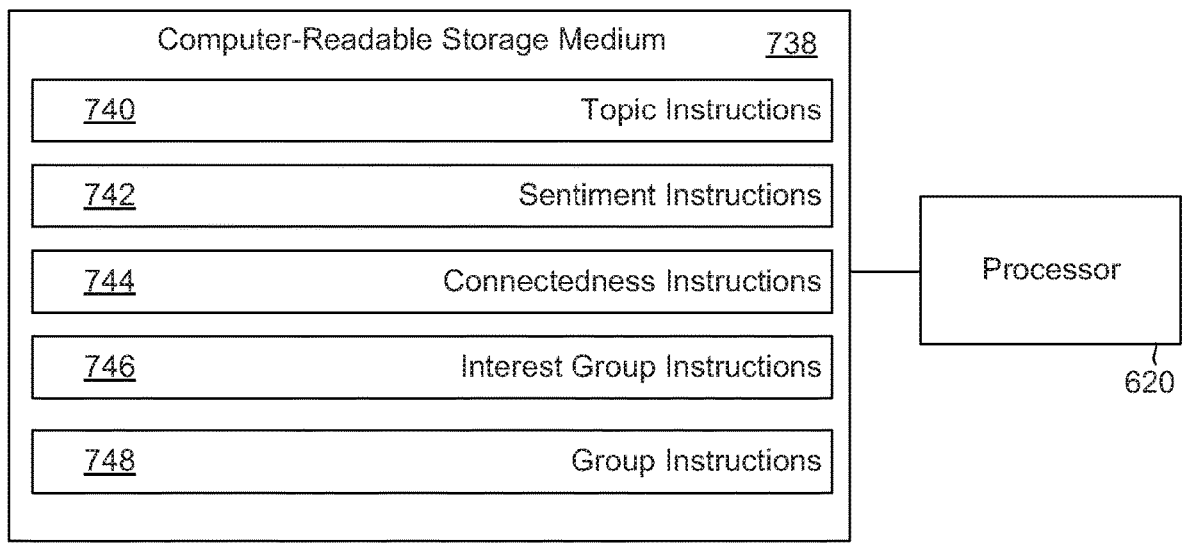
FIG. 7 depicts a computer readable storage medium for forming a connected interest group within a communication thread environment, according to an example of principles described herein.

FIG. 7 depicts a computer readable storage medium (738) for forming a connected interest group within a communication thread environment, according to an example of principles described herein. To achieve its desired functionality, a computing system includes various hardware components. Specifically, a computing system includes a processor (620) and a computer-readable storage medium (738). The computer-readable storage medium (738) is communicatively coupled to the processor (620). The computer-readable storage medium (738) includes a number of instructions (740, 742, 744, 746, 748) for performing a designated function. The computer-readable storage medium (738) causes the processor (620) to execute the designated function of the instructions (740, 742, 744, 746, 748).

Referring to FIG. 7, topic instructions (740), when executed by the processor (620), cause the processor (620) to determine a topic for a communication thread. Sentiment instructions (742), when executed by the processor (620), may cause the processor (620) to detect, within the communication thread, a number of communications (FIG. 3, 312) that reflect a similar sentiment related to the topic. Connectedness instructions (744), when executed by the processor (620), may cause the processor (620) to, determine a level of connectedness of authors corresponding to the set of communications (FIG. 3, 312) that reflect the similar sentiment related to the topic. In this example, the level of connectedness is based on 1) a level of connectedness within a local environment where the communication thread is presented, 2) a level of connectedness within at least one other environment, and 3) a level of interaction with other authors corresponding to the set of communications (FIG. 3, 312) that reflect the similar sentiment related to the topic. Interest group instructions (746), when executed by the processor (620), may cause the processor (620) to form a connected interest group by grouping authors with a level of connectedness greater than a predetermined threshold. Group instructions (748), when executed by the processor (620), may cause the processor (620) to group communications (FIG. 3, 312) that correspond to the connected interest group.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general purpose computer, special purpose computer, or other programmable data processing apparatus to produce a machine, such that the computer usable program code, when executed via, for example, the processor of the computing system or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

Such a system facilities a more accurate dissemination of information, and evaluation of public opinion, within a communication thread by accounting for the effects of connected group of users that share a similar sentiment and so indicating such a connected interest group to a participant in the communication thread and/or a manager of the communication thread. However, it is contemplated that the systems and method disclosed herein may address other matters and deficiencies in a number of technical areas.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   detecting, within a communication thread, a set of communications that reflect a similar sentiment related to a topic;
   determining a level of connectedness of authors who posted the of communications that reflect the similar sentiment related to the topic;
   forming a connected interest group comprising authors:
      who posted the set of communications that reflect the similar sentiment related to the topic; and
      with a level of connectedness greater than a predetermined threshold; and
   visually manipulating at least one of:
      icons associated with members of the connected interest group to identify them as members of the connected interest group; and
      communications that correspond to the connected interest group; and
   determining that communications that correspond to the connected interest group are not representative of participants of the communication thread by detecting whether communications that correspond to the connected interest group are down-voted or have a disproportionate lack of likes.

2. The computer-implemented method of claim 1, further comprising determining a topic for the communication thread.

3. The computer-implemented method of claim 1, wherein visually manipulating the set of communications that reflect the similar sentiment related to the topic comprises visually grouping communications that correspond to the connected interest group.

4. The method of claim 1, wherein determining a level of connectedness of the authors comprises determining that a graph representing the authors has a density greater than a threshold density.

5. The computer-implemented method of claim 1, wherein determining a level of connectedness of the authors comprises determining a level of interaction between the authors.

6. The computer-implemented method of claim 1, further comprising flagging communications by one author in the connected interest group based on a flagging of communications of other authors in the connected interest group.

7. The computer-implemented method of claim 1, wherein the level of connectedness reflects a level of connectedness within a local environment through which the communication thread is presented.

8. The computer-implemented method of claim 7, wherein the level of connectedness also reflects a level of connectedness within additional environments.

9. The computer-implemented method of claim 1, further comprising grouping the set of communications based on a secondary sentiment analysis.

10. The computer-implemented method of claim 1, further comprising analyzing a user's group of contributions to the communication thread to determine a sentiment of the group of communications related to the topic.

11. A system comprising:
a topic clusterer, comprising a processor, to determine a topic for a communication thread;
a sentiment analyzer, comprising a processor, to detect a set of communications within the communication thread that reflect a similar sentiment related to the topic;
a graph analyzer, comprising a processor, to:
  perform network analysis of just a subset of authors associated with the communication thread, the subset being the authors of the set of communications that reflect the similar sentiment related to the topic; and
  determine a connected interest group by:
    determining a level of connectedness of authors who posted the set of communications that reflect the similar sentiment related to the topic; and
    forming a connected interest group by grouping authors:
      who posted the set of communications that reflect the similar sentiment related to the topic; and
      who have a level of connectedness greater than a predetermined threshold; and
    determining that communications that correspond to the connected interest group are not representative of participants of the communication thread by detecting whether communications that correspond to the connected interest group are down-voted or have a disproportionate lack of likes; and
an interface to:
  visually manipulate avatars of members of the connected interest group to identify them as members of the connected interest group; and
  visually manipulate the set of communications corresponding to the connected interest group.

12. The system of claim 11, wherein the level of connectedness indicates a measured degree of relational separation of the authors within a social networking environment.

13. The system of claim 11, further comprising a database to store connected interest group information for use in subsequent communication thread processing.

14. The system of claim 11, further comprising a communications device to provide information relating to at least one of 1) the set of communications corresponding to the connected interest group and 2) the connected interest group, to a manager of the communication thread.

15. The system of claim 11, wherein the graph analyzer, in determining a level of connectedness of authors, weights connections between the authors.

16. The system of claim 11, wherein the interface presents a display of a set of messages to sample communications from across connected interest groups.

17. A computer program product, the computer program product comprising a computer readable storage medium having program instructions embodied therewith, the program instructions executable by a processor to cause the processor to:
determine a topic for a communication thread;
detect, within the communication thread, a set of communications that reflect a similar sentiment related to the topic;
perform network analysis on just a subset of authors associated with the communication thread, the subset being the authors of the set of communications that reflect the similar sentiment related to the topic;
based on the network analysis, determine a level of connectedness of authors who posted the set of communications that reflect the similar sentiment related to the topic, wherein the level of connectedness is based on:
  a level of connectedness within a local environment where the communication thread is presented;
  a level of connectedness within at least one other environment; and
  a level of interaction with other authors corresponding to the set of communications that reflect the similar sentiment related to the topic;
determining, based on the topic for the communication thread, a predetermined threshold against which the level of connectedness is compared;
form a connected interest group by grouping authors:
  who posted the set of communications that reflect the similar sentiment related to the topic;
  who have a level of connectedness greater than the predetermined threshold; and
  who exhibit a graph density greater than a threshold value;
provide an icon next to an avatar of each member of the connected interest group to identify them as members of the connected interest group;
provide an icon next to communications authored by those in the connected interest group;
visually group communications that correspond to the connected interest group;
determine that communications that correspond to the connected interest group are not representative of participants of the communication thread by detecting whether communications that correspond to the connected interest group are down-voted or have a disproportionate lack of likes;
provide an indication that communications that correspond to the connected interest group are not representative of participants of the communication thread; and
visually prioritize communications that correspond to the connected interest group to members of the connected interest group.

18. The computer program product of claim 17, wherein the local environment is a social networking environment.

19. The computer program product of claim 18, wherein the social networking environment is selected from the group consisting of an email environment, a calendaring environment, an instant messaging environment, a short messaging environment, a wiki environment, a community environment, a newsfeed environment, a project collaboration environment and a product review environment.

* * * * *